United States Patent
Leconte

(10) Patent No.: US 9,243,893 B2
(45) Date of Patent: Jan. 26, 2016

(54) OPTOELECTRONIC METHOD AND APPLIANCE FOR MEASURING THE INSIDE DIAMETER OF A HOLLOW BODY

(75) Inventor: Marc Leconte, Loire sur Rhone (FR)

(73) Assignee: MSC & SGCC, Vourles (FR)

( * ) Notice: Subject to any disclaimer, the term of this patent is extended or adjusted under 35 U.S.C. 154(b) by 0 days.

(21) Appl. No.: 14/236,917

(22) PCT Filed: Aug. 8, 2012

(86) PCT No.: PCT/FR2012/051865
§ 371 (c)(1),
(2), (4) Date: Apr. 2, 2014

(87) PCT Pub. No.: WO2013/021137
PCT Pub. Date: Feb. 14, 2013

(65) Prior Publication Data
US 2014/0347678 A1    Nov. 27, 2014

(30) Foreign Application Priority Data
Aug. 8, 2011 (FR) ....................... 11 57244

(51) Int. Cl.
*G01B 11/02* (2006.01)
*G01B 11/12* (2006.01)
*G01J 1/08* (2006.01)
*G01J 1/42* (2006.01)
*G06T 7/60* (2006.01)

(52) U.S. Cl.
CPC . *G01B 11/12* (2013.01); *G01J 1/08* (2013.01); *G01J 1/42* (2013.01); *G06T 7/602* (2013.01)

(58) Field of Classification Search
CPC ................... G01N 2033/0081; G01N 21/9018; G01N 21/90; G01N 21/9036; G01N 21/93; G01N 21/9009; G01N 2021/9063; G01N 21/9054; G01N 21/88; G01N 21/9027; G01N 2021/8832; G01N 21/21; G01N 21/8803
See application file for complete search history.

(56) References Cited

U.S. PATENT DOCUMENTS 5,175,428 A * 12/1992 Agerskov et al. ......... 250/223 B
2008/0198389 A1 * 8/2008 Yoo et al. .................. 356/626

FOREIGN PATENT DOCUMENTS

| JP | 57-142505 | 9/1982 |
|---|---|---|
| JP | 11-132730 | 5/1999 |

* cited by examiner

*Primary Examiner* — Michael P Stafira
(74) *Attorney, Agent, or Firm* — Clark & Body

(57) ABSTRACT

The invention relates to a method of measuring the inside diameter of a hollow body. According to the invention: the hollow body is illuminated from one side by a diffuse light source presenting two light boundaries that are spaced apart along the measurement axis so as to create two light transitions in an image, which transitions are spaced apart from each other and diametrically opposite; from the side of the hollow body that is opposite from its illuminated side, the light rays that are reflected and refracted by the hollow body are recovered to form at least one image in which there appear at least the two light transitions; and the image is processed in order to determine the distance between the two light transitions in order to determine a measurement for the inside diameter of the hollow body.

13 Claims, 2 Drawing Sheets

OPTOELECTRONIC METHOD AND APPLIANCE FOR MEASURING THE INSIDE DIAMETER OF A HOLLOW BODY

The present invention relates to the technical field of optoelectronically inspecting hollow items or containers in a general sense, and that are of a transparent or translucent nature, such as for example glass bottles, pots, or jars, in order to inspect or evaluate dimensional characteristics presented by such a hollow item.

A particularly advantageous but non-exclusive application of the invention lies in measuring the inside diameter of a hollow body, and in particular the inside diameter of the neck of a bottle.

In this field of application, there is a need to measure the inside diameter of a hollow item in order to determine whether the hollow item complies with dimensional criteria. For example, in the field of glass bottles, the inside diameter of the neck of a bottle must be measured in order to determine whether this portion of the bottle complies with criteria for ensuring that the bottle will be corked and uncorked correctly by a cork subsequently inserted into the neck of the bottle.

Various techniques are known for measuring the inside diameter of the neck of a container. For example, it is known to place a diffuse light source under the bottom of a container and to place a camera above its neck, the camera having a telecentric lens enabling the neck to be observed along its axis of revolution. It is thus possible to form an image of the neck of the container in which there can be seen a pale disk in the center of the image representing the smallest through section in the neck. That inspection technique makes it possible to measure the smallest diameter of the neck of the container regardless of its position along the neck of the container. That technique therefore does not make it possible to measure the inside diameter of the neck at a determined height along its vertical axis of revolution, thus putting a limit on the dimensions of the containers that can be inspected. In order to fully inspect corking and uncorking conditions of a container, it is necessary to be able to measure the inside diameter of the neck at least one determined section of the neck that is different from the section corresponding to its smallest diameter.

US patent application No. 2008/0198389 discloses an appliance for measuring the inside and outside diameters of a transparent tube. That appliance uses a collimated laser beam to illuminate the transparent tube along a line of light that is inclined relative to a plane perpendicular to the longitudinal axis of the tube. The light that is intercepted and refracted by the transparent tube is recovered by a camera via a screen that is interposed between the tube and the camera. Analyzing the shape of the recovered light beam makes it possible to determine the inside diameter along the transparent tube.

Such an appliance does not make it possible directly to measure the inside diameter of a hollow body at different sections of the hollow body. In an image, it is only the diameter at the level of the light source in the form of a line that can be measured. It is therefore necessary to cause the tube and the sensor to move relative to each other in a direction parallel to the central axis of the tube in order to make other measurements in other cross-sections, where this movement is in addition to rotating the item about its axis.

Patent applications JP 57 142505 and JP 11 132730 also describe a method of measuring the inside diameter of a tube with the help of a light beam passing through the tube and recovered by an electronic detector circuit. Such methods do not make it possible to detect accurately the inside diameter of a hollow body. Those methods require scanning by means of a source of finely collimated light of the laser type. The item must be held stationary so that it has no degree of freedom of movement in said transverse direction, at least throughout the complete scan of its entire cross-section, and that is not suitable for rapid industrial inspection of items that are heavy and imperfect. Furthermore, measuring a plurality of diameters on the same section requires the article to be rotated about its own axis, using rotation in increments with a stop at each increment, thereby occupying a large amount of time for analysis. Furthermore, if it is also desired to measure diameters at a plurality of cross-sections, measurement time becomes completely prohibitive, or else there are major errors due to the item moving while measurement is being performed.

The invention thus seeks to remedy the drawbacks of the prior art by proposing a technique that is simple to perform and that makes it possible in an industrial environment to measure rapidly and with great accuracy at least the inside diameter(s) of a hollow body at any height along the axis of revolution of the hollow body.

To achieve such an object, the method of the invention seeks to measure the inside diameter of a hollow body of revolution that is transparent or translucent and that is defined by an inside face and an outside face, the body presenting an axis of revolution along a vertical axis, the method consisting in illuminating the hollow body by means of a diffuse light source and in recovering the light rays emerging from the hollow body in order to form at least one image. According to the invention, the following steps are performed:

illuminating the hollow body on one side by means of a diffuse light source so that the incident light rays pass through the hollow body along at least one cross-section perpendicular to the axis of revolution and in which the inside diameter is to be measured along a measurement axis, the light source presenting two light boundaries spaced apart along the measurement axis so as to create two light transitions in the image that are spaced apart from each other and diametrically opposite about the vertical axis, corresponding to emerging light rays that propagate along respective lines tangential to the inside face and perpendicular to the diameter;

from the side of the hollow body that is opposite from its illuminated side, and by acting along an optical axis that is perpendicular to the vertical axis and perpendicular to the measurement axis, recovering the light rays that are reflected and refracted by the hollow body so as to form at least one image in which there appear at least the two light transitions; and processing the image so as to determine the distance along the measurement axis between the two light transitions in order to determine a measurement for the inside diameter of the hollow body.

The invention also seeks to propose a method making it possible to determine the inside diameter of a hollow body at different positions along the axis of revolution of the hollow body.

To achieve such an object, the method consists in illuminating a region of the hollow body that extends over a determined height along the vertical axis, in recovering the reflected and refracted emerging light rays so as to form an image of the hollow body over said height, and in determining the distance along the measurement axis between two light transitions at different levels along the vertical axis so as to determine measurements for the inside diameter at different heights of the hollow body.

In addition, the method of the invention may also present in combination at least one and/or another of the following additional characteristics:

causing the hollow body to rotate about the axis of revolution through at least part of a revolution and processing the images for different angular positions in rotation of the hollow item, with a measurement for the inside diameter at one or more heights being taken in each of those images;

determining the profile of the inside face from inside diameter measurements taken at different heights;

comparing the measurements of the inside diameter with reference values in order to determine whether the hollow body is or is not defective;

illuminating the hollow body by a light source having light boundaries on either side of the optical axis that lie along the measurement axis strictly between the position of an internal incident light ray and the position of an external incident light ray, the internal incident light ray generating the emerging light ray that is only refracted on passing through the hollow body and that is situated farthest from the optical axis, while the external incident light ray generates the emerging light ray that is reflected by the inside face of the hollow body and that is the closest to the optical axis;

illuminating the hollow body by a light source that emits light from its center and up to its light boundaries; and illuminating the hollow body by a light source that extends from the two light boundaries on either side of the axis and beyond the external incident light ray.

The invention also seeks to propose an appliance for measuring the inside diameter of a hollow body of revolution that is transparent or translucent.

To achieve such an object, the appliance for measuring the inside diameter of a hollow body of revolution that is transparent or translucent and that is defined by an inside face and an outside face presents an axis of revolution along a vertical axis, the appliance comprising a light source emitting light rays illuminating the hollow body and a recovery system for recovering light rays emerging from the hollow body in order to form at least one image, and an image acquisition and processor unit. According to the invention, the appliance comprises:

a diffuse and extensive light source arranged so that the incident light rays pass through the hollow body from one side and along at least one cross-section perpendicular to the axis of revolution and in which the inside diameter is to be measured along a measurement axis, the light source presenting two light boundaries spaced apart along the measurement axis so as to create two light transitions in the image, which transitions are spaced apart from each other and diametrically opposite about the vertical axis, corresponding to emerging light rays that propagate along respective lines tangential to the inside face and perpendicular to the diameter;

on the side of the hollow item opposite from its side illuminated by the source, a recovery system for acting along an optical axis that is perpendicular to the vertical axis and perpendicular to the measurement axis to recover emerging light rays as reflected and refracted by the hollow item, the system forming at least one image in which there appear at least two light transitions that are spaced apart from each other and diametrically opposite relative to the vertical axis; and an image acquisition and processor unit formed by the recovery system in order to determine the distance along the measurement axis between the two light transitions in order to determine a measurement for the inside diameter of the hollow body.

In addition, the appliance of the invention may also present in combination at least one and/or another of the following additional characteristics:

the diffuse and extensive light source possesses a determined height along the vertical axis for illuminating a vertical region of the hollow body, the recovery system recovers the emerging light rays reflected and refracted by the hollow body in a vertical region in order to form a corresponding image, and the image processor unit determines the distance between two light transitions along the measurement axis at different levels along the vertical axis in order to determine measurements for the inside diameter at different heights of the hollow body;

a system for causing the hollow body to rotate about the axis of revolution;

the light boundaries of the light source on either side of the optical axis lie along the measurement axis strictly between the position of an internal incident light ray and the position of an external incident light ray, the internal incident light ray generating the emerging light ray that is only refracted on passing through the hollow body and that is situated farthest from the optical axis, while the external incident light ray generates the emerging light ray that is reflected by the inside face of the hollow body and that is the closest to the optical axis;

the source is luminous from its center out to its light boundaries forming its vertical edges;

the light boundaries of the light source are optionally rectilinear with a profile that is adapted to the profile of the inside diameter of the hollow body;

the light source includes an adjustment system serving to vary the distance between the light boundaries;

the adjustment system comprises one or more masks for the light source, or a light source made using a series of light-emitting diodes with on/off control; and the recovery system comprises a camera having a telecentric lens so that the collected emerging light rays are parallel to the optical axis of the recovery system.

Various other characteristics appear from the following description made with reference to the accompanying drawings, which show embodiments of the invention as non-limiting examples.

Figure 1:
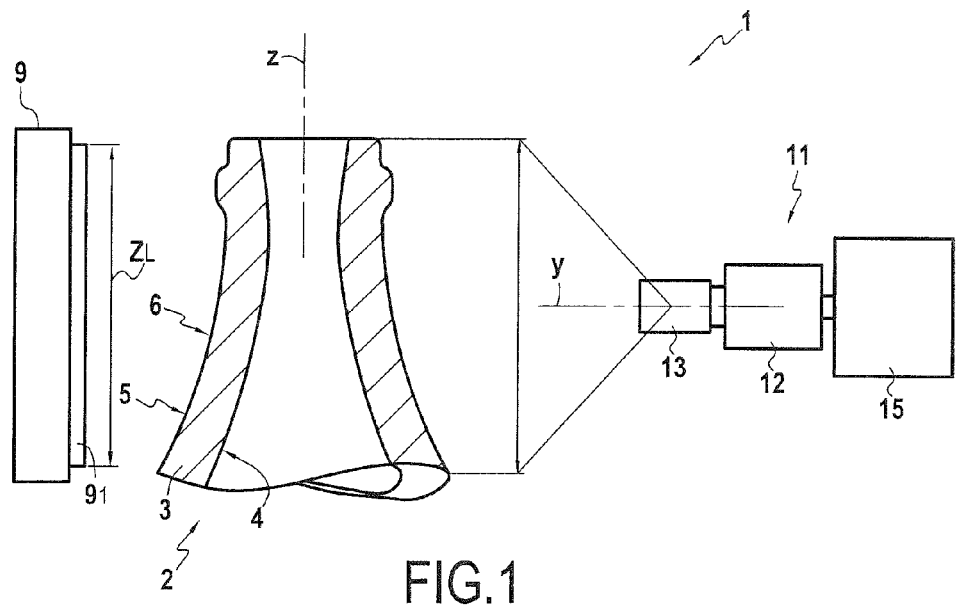
FIG. 1 is an elevation view showing an embodiment of an appliance measuring the inside diameter of a hollow body.
Figure 2:
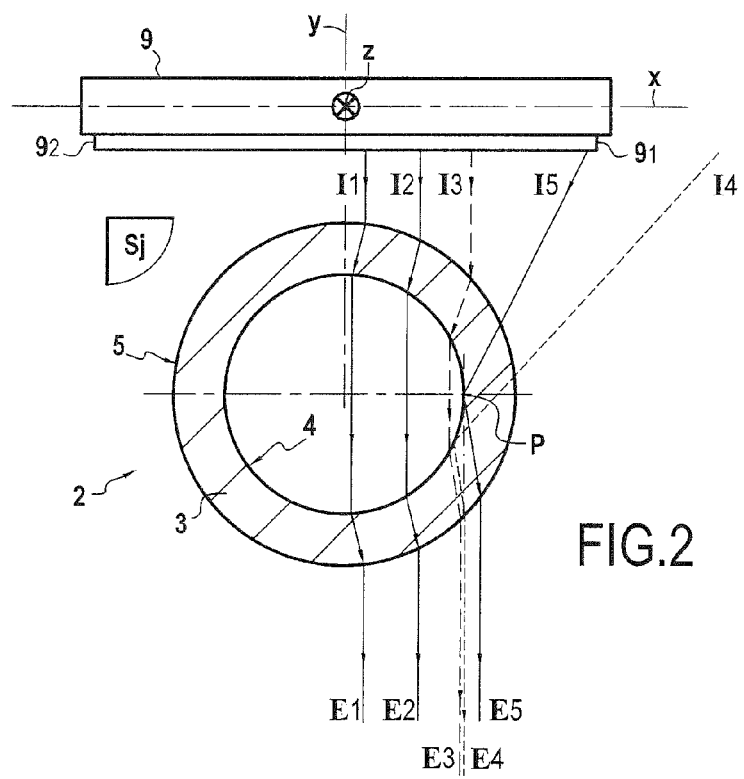
FIG. 2 is a plan view of the measurement appliance shown in FIG. 1.
Figure 3:
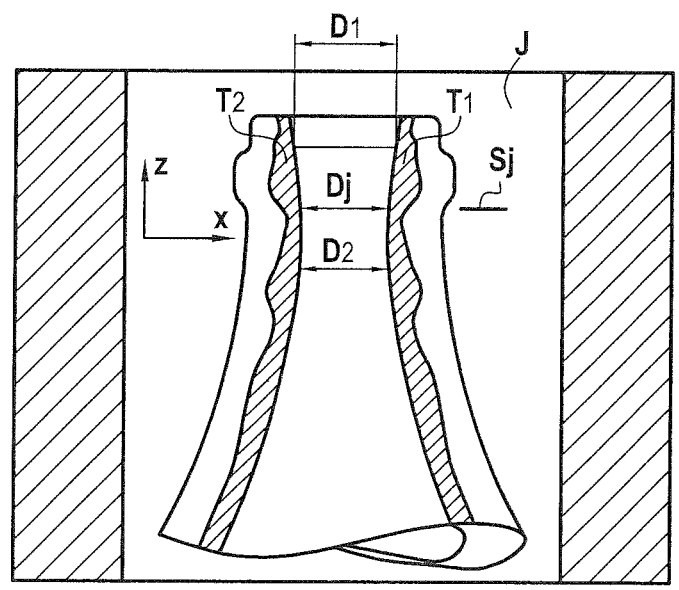
FIG. 3 is an example of an image taken of a hollow body and enabling its inside diameter to be measured.

As can be seen more clearly in FIGS. 1 and 2, the invention relates to an appliance 1 for measuring the inside diameter of a hollow body 2 that is transparent or translucent. In the example shown, the hollow body 2 is a container having an axis of revolution that is the vertical axis z. The hollow body 2 thus has a wall 3 that is defined by an inside face 4 and an outside face 5. In the preferred embodiment shown of a hollow item 2 such as a bottle, the hollow body 2 has a neck 6 in which at least one inside diameter $D_j$ of the hollow body 2 is to be measured. The inside diameter of the hollow body 2 is taken between two points of the inside face 4 that are situated on either side of the vertical axis z. Thus, the inside diameter is measured along a measurement axis x that is perpendicular to the vertical axis z (FIG. 3).

The appliance 1 also has a light source 9 of diffuse and extensive nature that emits incident light rays $I_i$ as shown in FIG. 2. The diffuse nature of the light source 9 should be understood in the conventional sense used in optics, i.e. each point of the light source 9 emits light in a multitude of directions. An emitting surface of the Lambertian type is a perfect model of this type of source, but naturally the range of angles emitted by the source could be restricted and the emission lobes need not be exactly hemispherical. The light source 9 is arranged on one side of the item 2 so that an incident light ray $I_i$ passes through the hollow body 2 along at least one cross-section $S_j$ perpendicular to the vertical axis z and in which the inside diameter $D_j$ is measured along the measurement axis x.

The appliance 1 also has a recovery system 11 acting on an optical axis y perpendicular to the vertical axis z and perpendicular to the measurement axis x, for recovering emerging light rays $E_i$ as reflected and refracted by the hollow body 2 from its side opposite from its side that is illuminated by the light source 9. As can be seen clearly in FIGS. 1 and 2, the light source 9 and the recovery system 11 are thus arranged on either side of the hollow body 2.

By way of example, the light beam recovery system 11 may comprise a camera 12 fitted with a lens 13 suitable for forming images. The camera 12 is connected to an image acquisition and processor unit 15 that is adapted to analyze the video signal delivered by the camera, in particular in order to measure the inside diameter of the hollow body from the images taken.

In a preferred embodiment, the camera 12 is provided with a telecentric lens 13 so that the emerging light rays $E_i$ that are collected are parallel to the optical axis y of the recovery system 11.

In an advantageous variant embodiment, the inspection zone of the camera 12 extends over a determined height along the vertical axis z of the hollow body in which it is possible to determine the inside diameter at various levels taken perpendicularly to the vertical axis z. For this the light source 9 presents a height $Z_L$ along the vertical axis z. In this variant embodiment, the light source extends firstly along the measurement axis x in order to present two light boundaries $9_1$ and $9_2$, and secondly along the vertical axis x, over a height $Z_L$.

In accordance with the invention, the light source 9 presents first and second light boundaries $9_1$, $9_2$ that extend vertically, i.e. in the example shown in a straight direction parallel to the vertical axis z. These two light boundaries $9_1$ and $9_2$ are spaced apart from each other along the measurement axis x. In the example shown in FIGS. 1 and 2, these light boundaries $9_1$ and $9_2$ correspond to the vertical edges of the light source 9. In this variant, the source 9 is luminous from its center and out as far as its two vertical edges $9_1$, $9_2$. In other words, the light source 9 does not emit light beyond the vertical edges $9_1$, $9_2$, such that these edges constitute light boundaries. In other words, each light boundary $9_1$ and $9_2$ corresponds to the junction zone along the measurement axis x between a light-emitting zone and a zone that does not emit light.

The light source 9 presents first and second light boundaries $9_1$ and $9_2$ so as to create, in the image formed by the camera 12, respective first and second light transitions $T_1$, $T_2$ that are spaced apart from each other and diametrically opposite about the vertical axis z, and that correspond to the emerging light rays that propagate tangentially to the inside face 4 and perpendicularly to the diameter of the hollow body. With reference to the notion of light boundaries $9_1$ and $9_2$, a light transition $T_1$, $T_2$ observable in an image J corresponds to a difference in gray level, such as for example changing from a pale zone to a dark zone, or vice versa.

The camera 12 thus recovers the emerging light rays $E_i$ that have been reflected and refracted by the hollow item 2 from the side opposite to the side that is illuminated by the light source 9. The recovery system 11 thus forms at least one image J (FIG. 3) in which there can be seen at least the two light transitions $T_1$ and $T_2$ that are spaced apart from each other and that are diametrically opposite about the vertical axis z.

As can be seen more clearly in FIG. 3, the resulting image J is processed by the acquisition and processor unit 15 so as to determine the distance along the measurement axis x between the two light transitions $T_1$ and $T_2$ in order to determine a measurement of the inside diameter $D_j$ of the hollow body 2.

According to a characteristic of the invention, the light boundaries $9_1$ and $9_2$ lie strictly along the measurement axis x between the position of an internal limiting incident light ray $I_3$ and the position of an external limiting incident light ray $I_4$ (FIG. 2). The positions of the limiting incident light rays are defined as follows.

The light source 9 is such that the two light boundaries $9_1$ and $9_2$ lie on either side of the optical axis y of the recovery system 11. For simplification purposes, the description below seeks to describe solely the position of the first light boundary $9_1$. It should thus be observed that only incident light rays $I_1$, $I_2$, $I_3$, and $I_5$ situated between the optical axis y and the first light boundary $9_1$ of the source 9 are shown in FIG. 2. Naturally, the paths followed by the light rays from the source 9 are symmetrical on either side of the optical axis y, such that the position of the second light boundary $9_2$ is defined identically to the corresponding position of the first boundary $9_1$.

It should be considered that the incident light rays $I_1$ and $I_2$ are only refracted on passing through the hollow body 2, such that the corresponding emerging light rays $E_1$, $E_2$ are picked up by the camera 12 so that a pale zone appears on the image (FIG. 3).

The incident light ray $I_3$ passes through the hollow body 2 while being only refracted on passing through the body 2. To this end, the emerging light ray $E_3$ corresponds to that one of the light rays collected by the camera 12 and that are only refracted on passing through the hollow body 2 that is the farthest from the optical axis y. The emerging light ray $E_3$ is such that it propagates along a line tangential to the inside face 4 and perpendicular to the diameter. As can be seen more clearly in FIG. 2, the line on which the emerging light ray $E_3$ propagates is tangential to the inside face 4 at a point P. It should be considered that the incident light ray $I_3$ is the "internal" limiting incident light ray for which a pale zone appears in the image J. The internal limiting incident light ray $I_3$ generates the emerging light ray $E_3$ that is only refracted on passing through the hollow body 2 and that is situated farthest from the optical axis y. In other words, the internal limiting incident light ray $I_3$ corresponds to the transition between refraction and reflection for the emerging light rays, thereby leading to the creation of the light transition $T_1$ in the image J.

FIG. 2 shows an incident light ray $I_4$ that is farther away from the optical axis y than is the incident light ray $I_3$. The incident light ray $I_4$ penetrates into the wall of the hollow body 2, is reflected on its inside face 4, and is then refracted on exiting through the outside face 5 so as to give rise to an emerging light ray $E_4$. It should be observed that the path followed by the emerging light ray $E_4$ is tangential to the inside face 4 of the hollow body at a point P. In other words, the emerging light rays $E_3$ and $E_4$ both coincide with the direction that is tangential to a common point P on the inside face 4 of the hollow body 2.

It should thus be considered that the emerging light ray $E_4$ is that one of the emerging light rays collected by the camera 12 and that have been subjected to reflection on the inside face 4 on passing through the hollow body 2 that is the closest to the optical axis y. Thus, if the light source 9 emits the incident light ray $I_4$, that masks the light transition $T_1$ in the image J. In order to avoid this phenomenon, the light boundary $9_1$ is such that the light source 9 does not generate the incident light ray $I_4$. The incident light ray $I_4$ is thus the external limiting incident light ray for positioning the light boundary $9_1$. The external limiting incident light ray $I_4$ corresponds to the light ray that generates that one of the emerging light rays reflected by the inside face 4 of the hollow body that is the closest to the optical axis y.

In other words, the first light boundary $9_1$ must be situated relative to the optical axis y so as to be set back relative to the external limiting light ray $I_4$. Under such conditions, a dark zone appears in the image J corresponding to the light transition $T_1$. It should be considered that the closer the first light boundary $9_1$ to the external incident light ray $I_4$, the smaller the width of the dark zone or light transition $T_1$. By way of illustration in FIG. 2, an incident light ray $I_5$ is shown close to the first light boundary $9_1$. This incident light ray $I_5$, which is situated between the incident light rays $I_3$ and $I_4$, gives rise to an emerging light ray $E_5$ that is farther from the optical axis y than the emerging light ray $E_3$, $E_4$. Conversely, the farther the first light boundary $9_1$ from the external limiting light ray $I_4$, i.e. the closer it is to the internal incident light ray $I_3$, the greater the increase in the width of the dark zone or light transition $T_1$.

To summarize, the light boundary $9_1$ must lie along the measurement axis x between the internal and external incident light rays $I_3$ and $I_4$, and it must be strictly between these two rays, i.e. it must not coincide with either of them. The position of the second light boundary $9_2$ is defined in a manner analogous to the position of the first light boundary $9_1$.

Thus, the light boundaries $9_1$ and $9_2$ on either side of the optical axis y lie along the measurement axis x strictly between the internal and external incident light rays $I_3$ and $I_4$.

This ensures a perfect match between the position of the first light transition $T_1$ (or inside edge of the shadow) and the position of the inside face 4 of the hollow body. Naturally, and in similar manner, there is a perfect match between the position of the second light transition $T_2$ (or edge of the shadow) and the position of the inside face 4.

It can be seen from the above description that the distance along the measurement axis x between the two light transitions $T_1$ and $T_2$ makes it possible to measure the inside diameter of the hollow body along at least one section of the body 2.

In a preferred variant embodiment in which the light source presents a determined height $Z_L$ along the vertical axis z, it is possible to recover the reflected and refracted emerging light rays so as to form an image of the hollow body 2 over a height, thus making it possible to determine the distance between two light transitions along the measurement axis x at different levels along the vertical axis z so as to measure the inside diameter ($D_1, D_2, \ldots, D_j$) at various heights of the hollow body 2 (FIG. 3).

According to an advantageous implementation characteristic, the method of the invention consists in causing the hollow body 2 to revolve about its axis of revolution z, through at least half a revolution. For this purpose, the hollow body 2 is driven in rotation by any appropriate means for rotating it about the axis of revolution z.

The method consists in processing the images acquired for different angular positions in the rotation of the hollow item 2, with it being possible to measure its inside diameter in each of the images at one or more heights.

Insofar as the inside diameter is measured at different heights of the hollow body 2, the method of the invention also makes it possible to determine the profile of the inside face 4.

The inside diameter measurements are compared with reference values in order to determine whether the hollow body is or is not defective. When the profile of the inside face is determined, it is possible to envisage comparing the measured inside profile of the inside face 4 with a reference profile in order to determine whether the hollow body is or is not defective.

In the embodiment shown in the drawings, the source 9 emits light all the way from its center to its vertical light boundaries $9_1$ and $9_2$.

It should be observed that it is possible to make provision for illuminating the hollow item by using a light source 9 that extends out from the two light boundaries $9_1$ and $9_2$ on either side of the axis z, beyond the external incident light rays $I_4$. Using such a light source makes it possible to obtain a gray scale image that is inverted relative to the image J that is obtained using the light source shown in FIGS. 1 and 2.

In the example shown, the light boundaries $9_1$ and $9_2$ extend along a straight direction parallel to the vertical axis z. Naturally, the light source 9 may present light boundaries that are not straight. Advantageously, the light boundaries $9_1$ and $9_2$ possess a profile or an outline that is adapted to the profile of the inside diameter of the hollow body 2.

According to an advantageous embodiment characteristic, the light source 9 includes an adjustment system for varying the distance along the measurement axis x between the light boundaries $9_2$ and $9_2$. Such an adjustment system makes it possible to adapt to the size of the hollow item 2 for inspection. To provide such an adjustment system, it is possible to use a plurality of masks for the light source 9, or to use a light source 9 that is constituted by a series of light-emitting diodes (LEDs) with on/off control.

The invention is not limited to the embodiments described and shown since various modifications can be applied thereto without going beyond its ambit.

The invention claimed is:

1. A method of measuring the inside diameter of a hollow body of revolution (2) that is transparent or translucent and that is defined by an inside face (4) and an outside face (5), the body presenting an axis of revolution along a vertical axis (z), the method consisting in illuminating the hollow body (2) by means of a diffuse light source (9) that each point of the diffuse light source emits light in a multitude of directions and in recovering the light rays emerging from the hollow body (2) in order to form at least one image, and being characterized by:

illuminating a region of the hollow body (2) that extends over a determined height along the vertical axis (z) on one side by means of a diffuse light source (9) so that the incident light rays ($I_i$) pass through the hollow body (2) along cross-sections perpendicular to the axis of revolution and in which the inside diameter is to be measured along a measurement axis (x), the light source (9) presenting two light boundaries ($9_1$, $9_2$) spaced apart along the measurement axis (x) and on either side of the optical axis (y), each of the light boundaries ($9_1$, $9_2$) lying along the measurement axis (x) strictly between the position of an internal incident light ray ($I_3$) and the position of an external incident light ray ($I_4$), the internal incident light ray ($I_3$) generating the emerging light ray ($E_3$) that is only refracted on passing through the hollow body and that is situated farthest from the optical axis (y), while the external incident light ray ($I_4$) generates the emerging light ray ($E_4$) that is reflected by the inside face (4) of the hollow body and that is the closest to the optical axis;

from the side of the hollow body that is opposite from its illuminated side, and by acting along an optical axis (y) that is perpendicular to the vertical axis (z) and perpendicular to the measurement axis (x), recovering the light rays that are reflected and refracted by the hollow body (2) so as to form at least one image (J) of the hollow body over said height in which there appear at least two light transitions ($T_1, T_2$); that are spaced apart from each other and diametrically opposite about the vertical axis (z), corresponding both to the emerging light ray ($E_3$) that is only refracted on passing through the hollow body and that is situated farthest from the optical axis (y) and to emerging light ray ($E_4$) that is reflected by the inside face of the hollow body and that is closest to the optical axis, the emerging light ray ($E_3$) and the emerging light ray ($E_4$) being both tangential to the inside face of the hollow body and coinciding at a common point; and processing the image (J) so as to determine the distance along the measurement axis (x) between the two light transitions ($T_1, T_2$) at different levels along the vertical axis (z) in order to determine a measurement for the inside diameter of the hollow body at different heights of the hollow body (2).

2. A method according to claim 1, characterized in that it consists in causing the hollow body (2) to rotate about the axis of revolution through at least part of a revolution and in processing the images for different angular positions in rotation of the hollow item, with a measurement for the inside diameter at one or more heights being taken in each of those images.

3. A method according to claim 1, characterized in that it consists in determining the profile of the inside face (4) from measurements of the inside diameter taken at different heights.

4. A method according to claim 1, characterized in that it consists in comparing the measurements of the inside diameter with reference values in order to determine whether the hollow body (2) is or is not defective.

5. A method according to claim 1, characterized in that it consists in illuminating the hollow body (2) by a light source (9) that emits light from its center and up to its light boundaries ($9_1, 9_2$).

6. A method according to claim 1, characterized in that it consists in illuminating the hollow body (2) by a light source (9) that extends from the two light boundaries ($9_1, 9_2$) on either side of the axis (x) and beyond the external incident light ray ($I_4$).

7. An appliance for measuring the inside diameter of a hollow body of revolution (2) that is transparent or translucent and that is defined by an inside face (4) and an outside face (5), the body presenting an axis of revolution along a vertical axis (z), the appliance comprising a light source (9) emitting light rays illuminating the hollow body (2) and a recovery system (11) for recovering light rays emerging from the hollow body (2) in order to form at least one image, and an image acquisition and processor unit (15), the appliance being characterized in that it comprises:

a diffuse and extensive light source (9) arranged so that each point of the light source emits light in a multitude of directions and the incident light rays pass through the hollow body (2) from one side and along at least one cross-section perpendicular to the axis of revolution, the region of the hollow body (2) extending over a determined height along the vertical axis (z), and containing the inside diameter to be measured along a measurement axis (x), the light source (9) presenting two light boundaries ($9_1, 9_2$) spaced apart along the measurement axis (x) and on either side of the optical axis (y), each of the light boundaries ($9_1, 9_2$) lying along the measurement axis (x) strictly between the position of an internal incident light ray ($I_3$) and the position of an external incident light ray ($I_4$), the internal incident light ray ($I_3$) generating the emerging light ray ($E_3$) that is only refracted on passing through the hollow body and that is situated farthest from the optical axis (y), while the external incident light ray ($I_4$) generates the emerging light ray ($E_4$) that is reflected by the inside face (4) of the hollow body and that is the closest to the optical axis;

on the side of the hollow item opposite from its side illuminated by the source, a recovery system (11) for acting along an optical axis (y) that is perpendicular to the vertical axis (z) and perpendicular to the measurement axis (x) to recover emerging light rays ($E_i$) as reflected and refracted by the hollow item, the system forming at least one image (J) of the hollow body over said height, in which there appear at least two light transitions ($T_1, T_2$) that are spaced apart from each other and diametrically opposite relative to the vertical axis (z), corresponding both to the emerging light ray ($E_3$) that is only refracted on passing through the hollow body and that is situated farthest from the optical axis (y) and to emerging light ray ($E_4$) that is reflected by the inside face of the hollow body and that is closest to the optical axis, the emerging light ray ($E_3$) and the emerging light ray ($E_4$) being both tangential to the inside face of the hollow body and coinciding at a common point; and an image acquisition and processor unit (15) formed by the recovery system (11) in order to determine the distance along the measurement axis (x) between the two light transitions ($T_1, T_2$) at different levels along the vertical axis (z) in order to determine a measurement for the inside diameter of the hollow body at different heights of the hollow body (2).

8. An appliance according to claim 7, characterized in that it includes a system for causing the hollow body (2) to rotate about the axis of revolution (3).

9. An appliance according to claim 7, characterized in that the source (9) is luminous from its center out to its light boundaries ($9_1, 9_2$) forming its vertical edges.

10. An appliance according to claim 7, characterized in that the light boundaries ($9_1, 9_2$) of the light source are optionally rectilinear with a profile that is adapted to the profile of the inside diameter of the hollow body (2).

11. An appliance according to claim 7, characterized in that the light source (9) includes an adjustment system serving to vary the distance between the light boundaries ($9_1, 9_2$).

12. An appliance according to claim 11, characterized in that, as its adjustment system, it includes one or more masks for the light source (9), or a light source (9) made using a series of light-emitting diodes with on/off control.

13. An appliance according to claim 7, characterized in that the recovery system (11) comprises a camera (12) having a telecentric lens (13) so that the collected emerging light rays ($E_i$) are parallel to the optical axis (y) of the recovery system (11).

* * * * *